United States Patent
Carlsten et al.

(10) Patent No.: US 10,746,868 B1
(45) Date of Patent: Aug. 18, 2020

(54) SYNTHETIC-APERTURE RADAR (SAR) IMAGING WITH RANGE-RESOLVED REFLECTION DATA

(71) Applicant: Triad National Security, LLC, Los Alamos, NM (US)

(72) Inventors: Bruce Carlsten, Los Alamos, NM (US); Stephen Judd, Los Alamos, NM (US)

(73) Assignee: Triad National Security, LLC, Los Alamos, NM (US)

( * ) Notice: Subject to any disclaimer, the term of this patent is extended or adjusted under 35 U.S.C. 154(b) by 505 days.

(21) Appl. No.: 15/640,717

(22) Filed: Jul. 3, 2017

Related U.S. Application Data (60) Provisional application No. 62/385,503, filed on Sep. 9, 2016.

(51) Int. Cl.
*G01S 13/90* (2006.01)
*G01S 13/02* (2006.01)

(52) U.S. Cl.
CPC .......... *G01S 13/90* (2013.01); *G01S 13/0209* (2013.01)

(58) Field of Classification Search
CPC .. G01S 13/90; G01S 13/9011; G01S 13/9017; G01S 13/9019; G01S 13/9021; G01S 13/9094
See application file for complete search history.

(56) References Cited

U.S. PATENT DOCUMENTS

| | | | | |
|---|---|---|---|---|
| 5,796,363 A | * | 8/1998 | Mast | G01S 7/292 342/179 |
| 5,835,054 A | * | 11/1998 | Warhus | G01S 7/292 342/22 |
| 6,828,933 B1 | * | 12/2004 | Doerry | G01S 7/282 342/194 |
| 7,876,869 B1 | * | 1/2011 | Gupta | H04B 1/109 375/350 |
| 8,974,390 B1 | * | 3/2015 | Sankar | G01S 7/5202 600/407 |

(Continued)

*Primary Examiner* — Peter M Bythrow
(74) *Attorney, Agent, or Firm* — Leonardpatel P.C.; Michael Aristo Leonard, II; Sheetal Suresh Patel (57) ABSTRACT

SAR imaging may be performed with range-resolved reflection data, where a spread-spectrum signal, such as a code division multiple access (CDMA) signal, is transmitted instead of a simple frequency chirp. The reflected spread-spectrum signal may be analyzed to gather range-resolved reflection data. Range-resolved reflection data may be gathered at each angular view. This data may be used to construct a more accurate approximation of the Fourier transform of the desired image than can be done by a conventional SAR approach. The image may be reconstructed from this Fourier transform using Fourier inversion techniques similar to those used in conventional SAR approaches. The range-resolved reflection scheme generally requires somewhat more processing to recover the image as compared with conventional SAR systems, but provides a significantly more stable image with less degradation from effects that plague conventional SAR systems. This can eliminate the need for phase coherency altogether and also eliminate "phase drift," which leads to image distortion. This may be especially well suited for high resolution imaging of relatively large targets.

18 Claims, 10 Drawing Sheets

(56) References Cited

U.S. PATENT DOCUMENTS

| | | | | |
|---|---|---|---|---|
| 2003/0142001 A1* | 7/2003 | Subotic | ............ | H04W 56/0035 |
| | | | | 342/25 R |
| 2005/0212692 A1* | 9/2005 | Iny | ........................ | G01S 13/765 |
| | | | | 342/42 |
| 2008/0042895 A1* | 2/2008 | Inaba | ...................... | G01S 13/34 |
| | | | | 342/112 |
| 2008/0065427 A1* | 3/2008 | Helitzer | ................. | G06Q 40/08 |
| | | | | 705/4 |
| 2012/0200446 A1* | 8/2012 | Shirakawa | .............. | G01S 13/90 |
| | | | | 342/27 |
| 2013/0314268 A1* | 11/2013 | Fukuda | ............... | G01S 13/0209 |
| | | | | 342/21 |
| 2014/0133322 A1* | 5/2014 | Steer | ....................... | H01Q 3/26 |
| | | | | 370/252 |
| 2016/0065323 A1* | 3/2016 | Zemp | .................. | H04J 13/0022 |
| | | | | 375/142 |
| 2016/0131752 A1* | 5/2016 | Jansen | .................. | G01S 13/343 |
| | | | | 342/27 |

* cited by examiner

FIG. 1

RELATED ART

FIG. 2

RELATED ART

SYNTHETIC-APERTURE RADAR (SAR) IMAGING WITH RANGE-RESOLVED REFLECTION DATA

CROSS REFERENCE TO RELATED APPLICATION

This application claims the benefit of U.S. Provisional Patent Application No. 62/385,503 filed Sep. 9, 2016. The subject matter of this earlier filed application is hereby incorporated by reference in its entirety.

STATEMENT OF FEDERAL RIGHTS

The United States government has rights in this invention pursuant to Contract No. DE-AC52-06NA25396 between the United States Department of Energy and Los Alamos National Security, LLC for the operation of Los Alamos National Laboratory.

FIELD

The present invention generally relates to radar, and more particularly, to synthetic aperture radar (SAR) imaging with range-resolved reflection data.

BACKGROUND

The most common form of imaging radar is SAR. Carl Wiley of the Goodyear Corporation, a legacy company of Lockheed Martin, invented the SAR concept in 1952. The first airborne SAR was flown on a DC-3 in 1953. Since then, SAR has become a ubiquitous imaging technique, capable of all-weather sub-meter resolution imaging.

In conventional SAR systems, the radar generates radio frequency (RF) images with near-optical quality by coherently integrating the return of a frequency-chirped radar as it travels over some distance in order to form a synthetic aperture for the antenna. Conventional SAR employs a transmitted radio frequency (RF) signal with a frequency chirp to interrogate a target region (i.e., a patch) at different angular views. Target reflections (i.e., a reflected RF signal) lead to a received signal, and the image is formed from the phase information from the received signal. Basically, the bandwidth B of a SAR resolves range, with a resolution of $$S_{range} = \frac{c}{2B} \quad (1)$$

where c is the speed of light.

Figure 1:
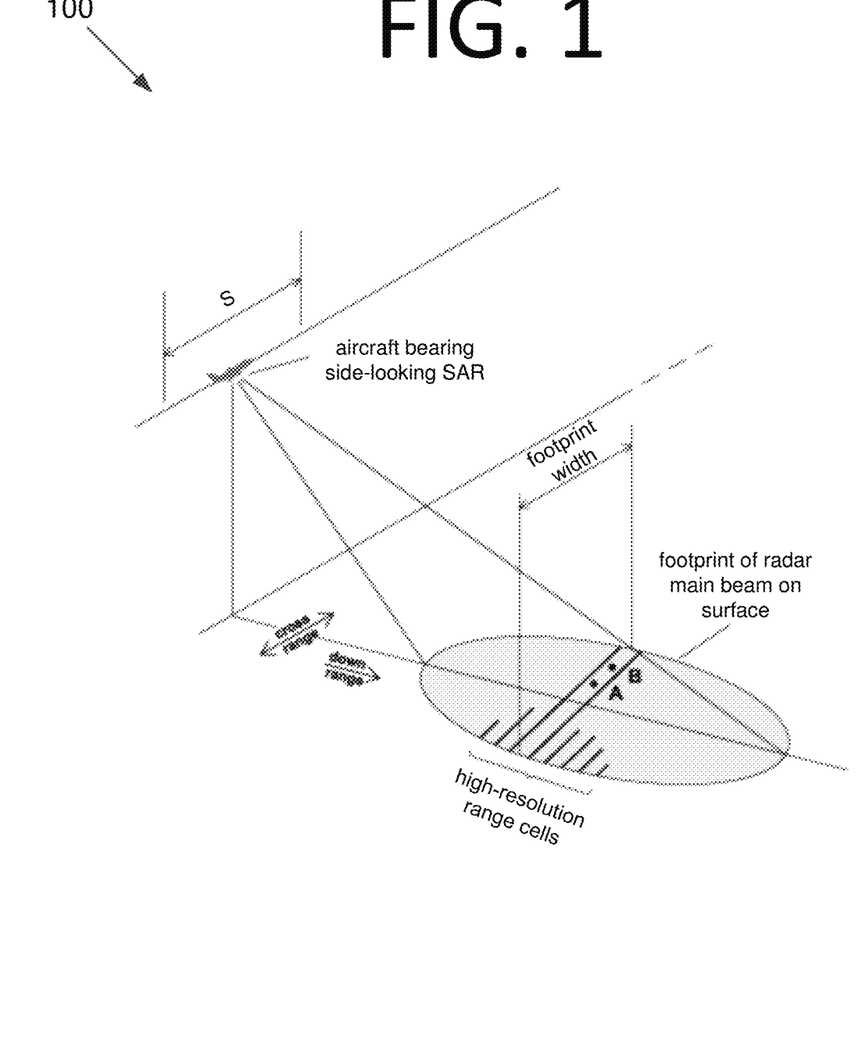
FIG. 1 is a schematic diagram illustrating spotlight-mode SAR parameters and definitions.

In the case of a conventional "spotlight-mode" SAR, the radar stays pointed at the center of a target patch. The different views typically result from the radar traveling by the target on a path, as shown in FIG. 1, which is a schematic diagram 100 illustrating spotlight-mode SAR parameters and definitions using a plane-based SAR. A target patch on the ground is interrogated at some distance orthogonal to a flight path. The direction away from the flight path is called "down-range" and the direction on the ground parallel to the flight path is called "cross-range." The SAR transmits at a frequency that chirps through a frequency bandwidth. Each chirp occurs very fast, and for simplicity, the plane can be considered stationary during the chirp since the distance traveled between chirps is very small. These chirps are repeated as the plane moves through discrete angular positions along the flight path relative to the target patch center, with a chirp and the associated reflected signal received at these specific angular locations.

For a conventional spotlight mode SAR, phase interferometry is used to resolve cross-range, with a cross-range resolution of $$S_{cross-range} = \frac{\lambda R}{S} \quad (2)$$

where $\lambda$ is the wavelength of the SAR's center frequency, S is the distance along the path over which the different angular views are taken, and R is the distance from the path to the target (known as the offset). Phase interferometry requires that there is a negligible phase drift in the carrier frequency over the entire viewing path with length A, on the order of 45° or less.

In a conventional spotlight mode SAR, at each angular location, the received data is mixed with the transmission signal (i.e., a carrier) as a function for the chirped frequency, both in-phase (resulting in the in-phase signal I) and out-of-phase (resulting in the quadrature signal Q). In other words, the radar return is mixed with the in-phase and out-of-phase transmit signal, which gives I and Q. A key aspect of SAR is that the constructed quantity I+jQ is very nearly the two-dimensional Fourier transform $G(k_x, k_y)$ of the target's scattering function (also known as the reflection function), defined as g(x,y), where (x=0,y=0), defines the center of the target, since the angular frequency divided by the speed of light, $2\pi f/c$, is the wavenumber k (the Fourier transform of real space).

The quantity I+jQ can be inverted to approximately find the reflection function g(x,y) within the target patch. Importantly, this inversion can be thought of as first integrating along the direction of view (known as "de-ramping" because the Fourier integral is over the frequency chirp) and then integrating along the angular spread of the wavenumber (which, from a fundamental theory of Fourier transforms, is the same angle as the physical viewing angle). The first de-ramping integral identifies the distance to the reflectors in the target patch, but cannot resolve their relative cross-range positions.

The de-ramping process bins down-range locations into "range cells", shown as lines along the target patch in FIG. 1. These cells are the width of the SAR's range resolution. For example, points A and B in FIG. 1 would be indistinguishable from the de-ramping process. Importantly, each return signal from each range cell has a phase of I and Q associated with the offset of that position from the target patch center. The second Fourier integral is equivalent to an integral correlating these phases of each individual reflector, which change as the angular view changes.

The resolution of the SAR image (i.e., the range cell size) in the down-range direction is 2B/c, where B is the SAR's frequency bandwidth and the resolution in the cross-range direction is the SAR's carrier wavelength divided by the total angular view on the target ($\lambda/\theta$, in radians). To get fine down-range resolution, a very high bandwidth is needed. To get fine cross-range resolution, both a small carrier wavelength and a large angular view of the target patch are needed. Increasing the carrier frequency leads to increased phase drift over the viewing path and increased bandwidth leads to increased deviation of I+jQ from $G(k_x, k_y)$, known as phase distortion. Combined, these effects lead to fundamental limitations for conventional spotlight SARs in achieving very fine resolution of targets that need long integration paths due to large offset distances.

Here, and in the following example, two-dimensional scattering and imaging is considered. The extension to three dimensions is straightforward and follows the conventional extension for three-dimensional SAR algorithms. The domain of the constructed quantity $G(k_x,k_y) \approx I+jQ$ in Fourier space is shown in graph 200 of FIG. 2.

Figure 2:
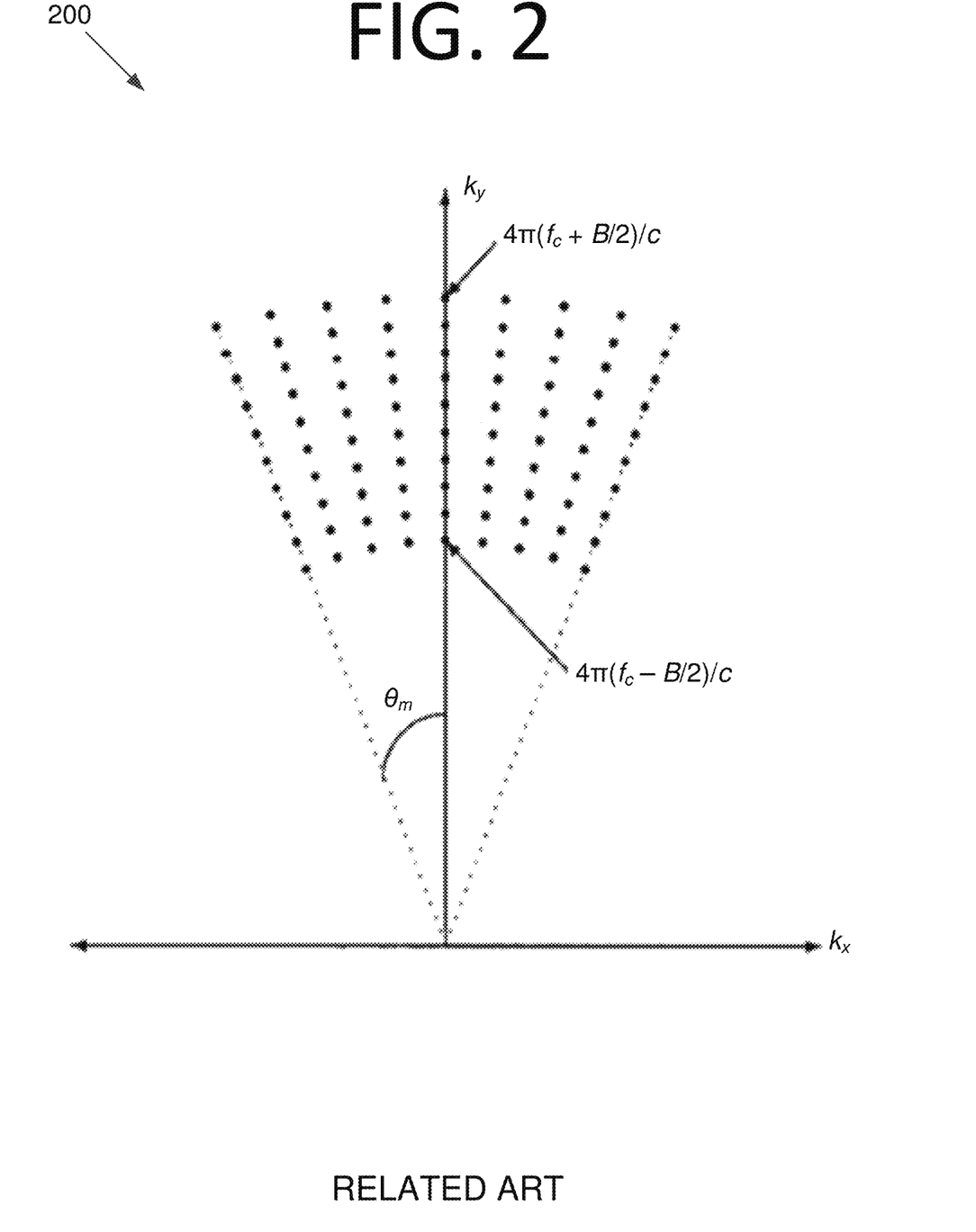
FIG. 2 is a graph illustrating Fourier domain locations for received information for a case with nine azimuthal views and ten transmitted frequencies.

Note that the Fourier-space wavenumbers appear through the frequency chirp, i.e., $k_x=(4\pi f/c) \cos \theta$ and $k_y=(4\pi f/c) \sin \theta$, where f is the transmit frequency and $\theta$ is the view angle (which is the same angle in Fourier space by the Slice Projection Theorem). The Fourier transformed scattering function is $$G(k_x, k_y) = \frac{1}{2\pi} \int_{-\infty}^{\infty} \int_{-\infty}^{\infty} g(x, y) e^{-j(xk_x+yk_y)} dx dy \quad (3)$$

and the original scattering function can be recovered from $$g(x, y) = \frac{1}{2\pi} \int_{-\infty}^{\infty} \int_{-\infty}^{\infty} G(k_x, k_y) e^{-j(xk_x+yk_y)} dk_x dk_y \quad (4)$$

However, the approximation of $G(k_x,k_y)$ is not known over the entire k-space. Rewriting in polar coordinates to indicate the limits of the received SAR data, the reconstructed scattering image using direct Fourier inversion is then given by $$f(x, y) = \frac{1}{2\pi} \int_{\pi/2-\theta_0}^{\pi/2+\theta_0} \int_{k_{min}}^{k_{max}} G(k, \theta) e^{-j(xk\cos\theta+yk\sin\theta)} k\, dk\, d\theta \quad (5)$$

where $k_{min}$ and $k_{max}$ are respectively given by $4\pi(f_c-B/2)/c$ and $4\pi(f_c+B/2)/c$ functions of the carrier frequency $f_c$ and the bandwidth B, and the angular views extend from $\pi/2-\theta_0$ to $\pi/2+\theta_0$. Note that $(x \cos \theta + y \sin \theta)$ is the distance $\delta_{x,y}$ of (x,y) projected onto the view angle from the target center with the geometry shown in FIG. 3. The function $f$ can be rewritten as $$f(x, y) = \frac{1}{2\pi} \int_{\pi/2-\theta_0}^{\pi/2+\theta_0} \int_{k_{min}}^{k_{max}} G(k, \theta) e^{-jk\delta_{x,y}} k\, dk\, d\theta \quad (6)$$

There are several approaches for reconstructing the scattering image, including polar reformatting and convolution backprojection (CBP) for direct Fourier inversion. Additionally, standard inversion techniques like the Maximum Entropy Method can be used to improve on the direct Fourier inversion. In polar reformatting, the data in Fourier space is first interpolated onto a Cartesian grid and then a Cartesian two-dimensional FFT is performed to recover $f(x,y)$, requiring $O(N^2 \log N)$ operations for an N×N SAR image. In CBP, $f(x,y)$ is directly calculated from Eq. (6) using the polar coordinates, typically requiring $O(N^3)$ operations. Since FFTs require a Cartesian frame, non-FFT Fourier transforms need to be numerically completed for CBP. Several schemes have been proposed to reduce the complexity of the CBP approach down to $O(N^2 \log N)$. Despite the typically larger computational complexity, CBP has the advantage that the image can be initially formed with few azimuthal views and continually improved as more views are added, making it especially attractive to applications where limited computer memory is available.

A significant issue with conventional spotlight SAR is that it requires phase coherency of the transmitter over the entire pass over the target. For relatively high radar frequencies, such as those needed for fine resolutions (e.g., 100 GHz is needed for approximately centimeter-scale resolutions), coherency can only be maintained for seconds. However, tens of minutes are often required to complete the angular views. Accordingly, an improved approach to SAR imaging may be beneficial.

SUMMARY

Certain embodiments of the present invention may provide solutions to the problems and needs in the art that have not yet been fully identified, appreciated, or solved by conventional SAR solutions. For example, some embodiments of the present invention pertain to SAR imaging where range-resolved reflection data is used in the imaging reconstruction instead of the in- and out-of-quadrature mixed signals, I+jQ. Among other approaches, a code division multiple access (CDMA) spread-spectrum signal can be transmitted instead of a simple frequency chirp to gather the range-resolved reflection data. If the spread-spectrum bandwidth is the same, the SAR can return an equivalent down-range resolution.

Range-resolved reflections may be measured at each angular view. This generally requires somewhat more processing to recover the image as compared with conventional SAR systems, but provides a significantly more stable image with less degradation from effects that plague conventional SAR systems. Such embodiments may eliminate the need for phase coherency. Also, such embodiments may eliminate "phase drift" (a second order noise effect in conventional chirped SAR), which leads to image distortion. Some embodiments are especially well suited for high resolution imaging of relatively large targets (e.g., megapixel-sized images with cm-scale resolutions).

In an embodiment, a computer-implemented method includes analyzing a reflected spread-spectrum signal, by a computing system, and gathering range-resolved reflection data from the spread-spectrum signal. The computer-implemented method also includes exactly constructing an approximation of a two-dimensional Fourier transform of a target's scattering function, by the computing system.

In another embodiment, a computer-implemented method includes transmitting a CDMA spread-spectrum signal, by a computing system, and receiving a reflected CDMA spread-spectrum signal, by the computing system. The computer-implemented method also includes analyzing the reflected CDMA spread-spectrum signal, by a computing system, and gathering range-resolved reflection data from the CDMA spread-spectrum signal, by the computing system. The computer-implemented method further includes exactly constructing an approximation of a two-dimensional Fourier transform of a target's scattering function, by the computing system, and generating a high resolution image, by the computing system. The range-resolved reflection data from the CDMA spread-spectrum signal is gathered at each angular view of a plurality of angular views and the high resolution image has a resolution of 1.5 centimeters or less.

In yet another embodiment, a computer-implemented method includes transmitting a CDMA spread-spectrum signal, by a computing system, and receiving a reflected CDMA spread-spectrum signal, by the computing system.

The computer-implemented method also includes obtaining reflections from reflectors in the reflected CDMA spread-spectrum signal at each angular view as returned signals, by the computing system. The computer-implemented method further includes correlating the returned signals, by the computing system, with a delayed version of the transmitted CDMA spread-spectrum signal to obtain range-resolved data at each angular view. The delayed version of the transmitted CDMA signal is delayed by a delay time.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Some embodiments of the present invention pertain to SAR imaging with range-resolved reflection data. This is a two-step process in some embodiments. First, the range-resolved reflection data may be gathered. Second, this data may be used to exactly construct a highly accurate approximation of the two-dimensional Fourier transform $G(k_x, k_y)$ of the target's scattering function. This approximation is more accurate than the I+jQ approximation in a conventional SAR.

Gathering the range-resolved reflection data may be accomplished by using a spread-spectrum approach instead of a simple frequency chirp. At each angular view of the target, range-resolved reflection data may be obtained from reflections within the target. The range-resolved reflection data may be generated, for example, by imposing a spread-spectrum CDMA coding on a carrier. More specifically, an M code signal may be coded onto the carrier by changing the phase 0 or π degrees. As an example, the phase may be changed at 10 GHz on a 100 GHz carrier using an M code with N separate bits. The returned signal may be correlated with a delayed version of the transmitted signal. If the delay time is exactly the same as the round trip time of the returned signal, the correlation is N. If the delay time is off by a time of at least ½B, the correlation is −1. If the delay time is off by less than ½B, the correlation is proportionally between N and −1. Thus, the range of a reflector can be determined with a resolution of c/2B. A notional CDMA-SAR at 100 GHz with a 10 GHz bandwidth can theoretically have 1.5 cm resolution, which is better than any conventional SAR.

Once the range-resolved data at an angular view is obtained, the Fourier transform of the image $G(k_x, k_y)$ may be synthetically constructed mathematically. A radial Fourier transform may be performed at each of the angular views, and an angular Fourier transform may then be performed as more views are collected. This builds the image as the views are conducted. Additionally, standard inversion techniques like the Maximum Entropy Method can be used to improve on the direct Fourier inversion.

In some embodiments, hardware masking is possible with the CDMA approach. This allows the first Fourier transform along the down-range direction to be performed in hardware, greatly reducing the overall computational load for generating an image.

A special case may be considered in some embodiments, where a modified CBP approach provides additional important advantages. Specifically, the case where the data is provided in terms of range-resolved reflectors along each azimuthal view is considered. This form of data is especially convenient for relatively small targets that are interrogated with fine resolution (i.e., large bandwidths).

Figure 3:
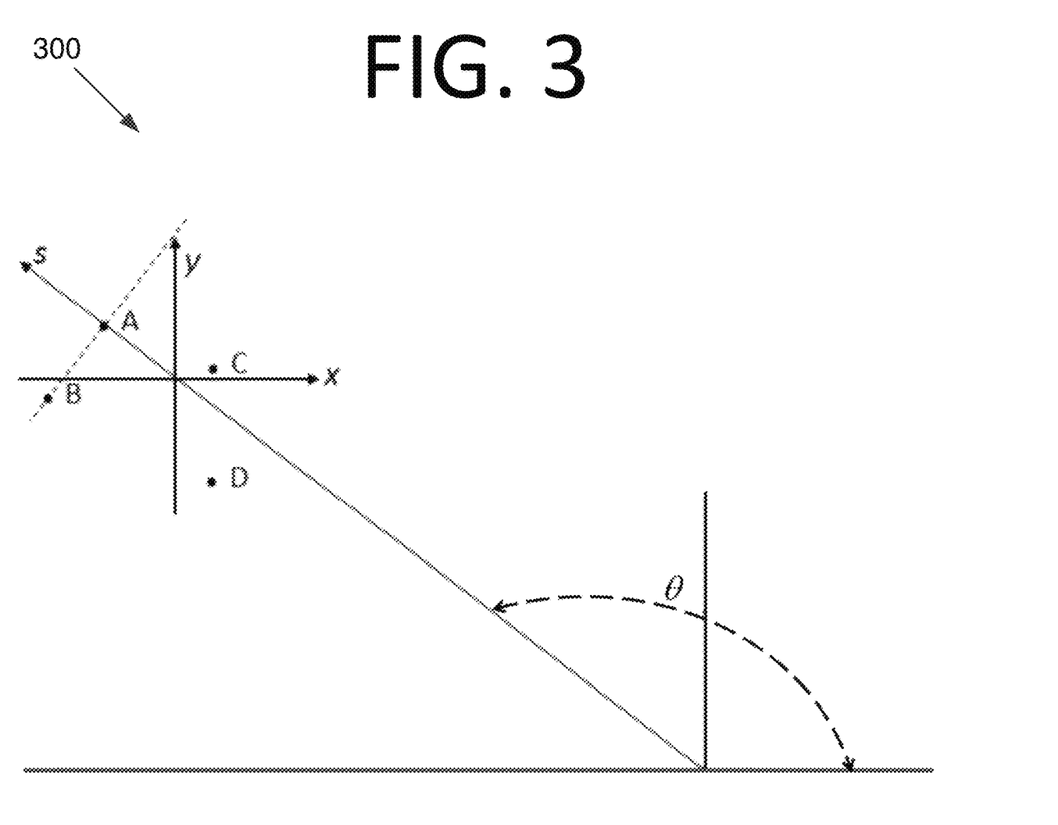
FIG. 3 is a graph illustrating notional reflectors in a target with reflection coefficient R, according to an embodiment of the present invention.
Figure 4:
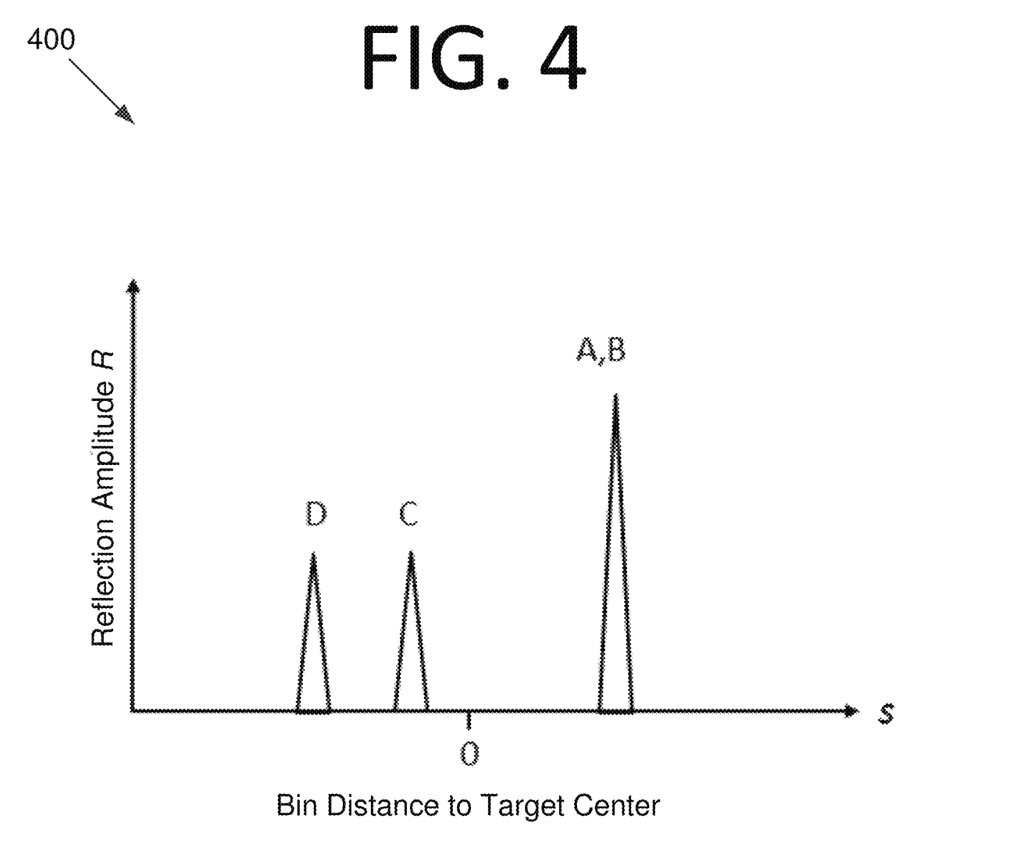
FIG. 4 is a graph illustrating range-resolved data corresponding to reflectors A, B, C, and D for a specific view angle θ, according to an embodiment of the present invention.

Graphs 300 and 400 of FIGS. 3 and 4 illustrate what is meant by range-resolved reflection information along each azimuthal view. The basic idea is that there is a target patch to be imaged with a local x-y coordinate system. From some distance, scatters are interrogated within the patch (denoted as reflectors A, B, C, and D in FIG. 3) by series of RF signals, while traveling in a line offset s from the patch (the line can also be curved, with no change in the results). Each interrogation occurs at an angle θ relative to the y-axis and consists of looking at reflections from these scatters. For the interrogation angle shown in graph 300 of FIG. 3, the returns from reflectors A and B arrive at the receive antenna at the same time, and are preceded by signals from reflector D and then and then reflector C. As the angle θ varies, the relative spacing of the reflectors varies. Assuming the interrogation locations move to the left, reflectors B and C are next seen at the same range. Finally, B and D, as well as A and C, are seen as equidistant.

"Fast time" and "slow time" are considered in some embodiments, or that both the transmission and receiving locations are fixed for each chirp (i.e., the time it takes to chirp the frequency and to receive the signal leads to a negligible motion of the transmit and receive antenna). The Fourier transform of the reflection function G is approximated from the reflection data at each angular view θ by $$G_{approx}(k, \theta) = \sum_n \frac{A_n}{R_n^2} e^{jk\delta_n} \quad (7)$$

where $A_n$ is the amplitude returned for range bin n, $R_n$ is the distance to range bin n, and $\delta_n = R_n - R_0$, where $R_0$ is defined as the distance to the center of the patch. This approximate function is then inverted by using Eq. (5).

A key aspect of some embodiments is that reflections from all reflectors within the target are seen from each view unless one or more reflectors is obscured by another reflector. This is different from other forms of tomography reconstruction where, for example, integrated density along a linear path is measured at different angles, which requires a Radon transform to invert. Per the above, range-resolved data may be directly obtained using spread-spectrum CDMA coding of the transmitted signal.

Fourier transforming the phase offset over azimuthal positions interferometrically determines the reflector's (x,y) coordinates. Importantly, the analysis of some embodiments does not require that the RF phase fronts are parallel at the location of the target. The range-resolved approach eliminates phase drifts that lead to image distortion in conventional SARs.

This approach requires $O(N^4)$ operations even when an analytic form is used for the frequency integration. However, this approach has significant advantages. These include, but are not limited to, eliminating the requirement for long coherency times (especially easing issues for very high-frequency SARs), eliminating phase drift and errors associated with frequency de-ramping, eliminating issues associated with non-parallel RF phase fronts at the target location, the ability to use the raw data as a mask to sharpen the SAR-produce image, and smaller computer memory requirements because each angular view data set is only sequentially needed and can be discarded once it is added to the image being processed.

Directly Obtaining Range-Resolved Reflection Data Using CDMA

Figure 5:
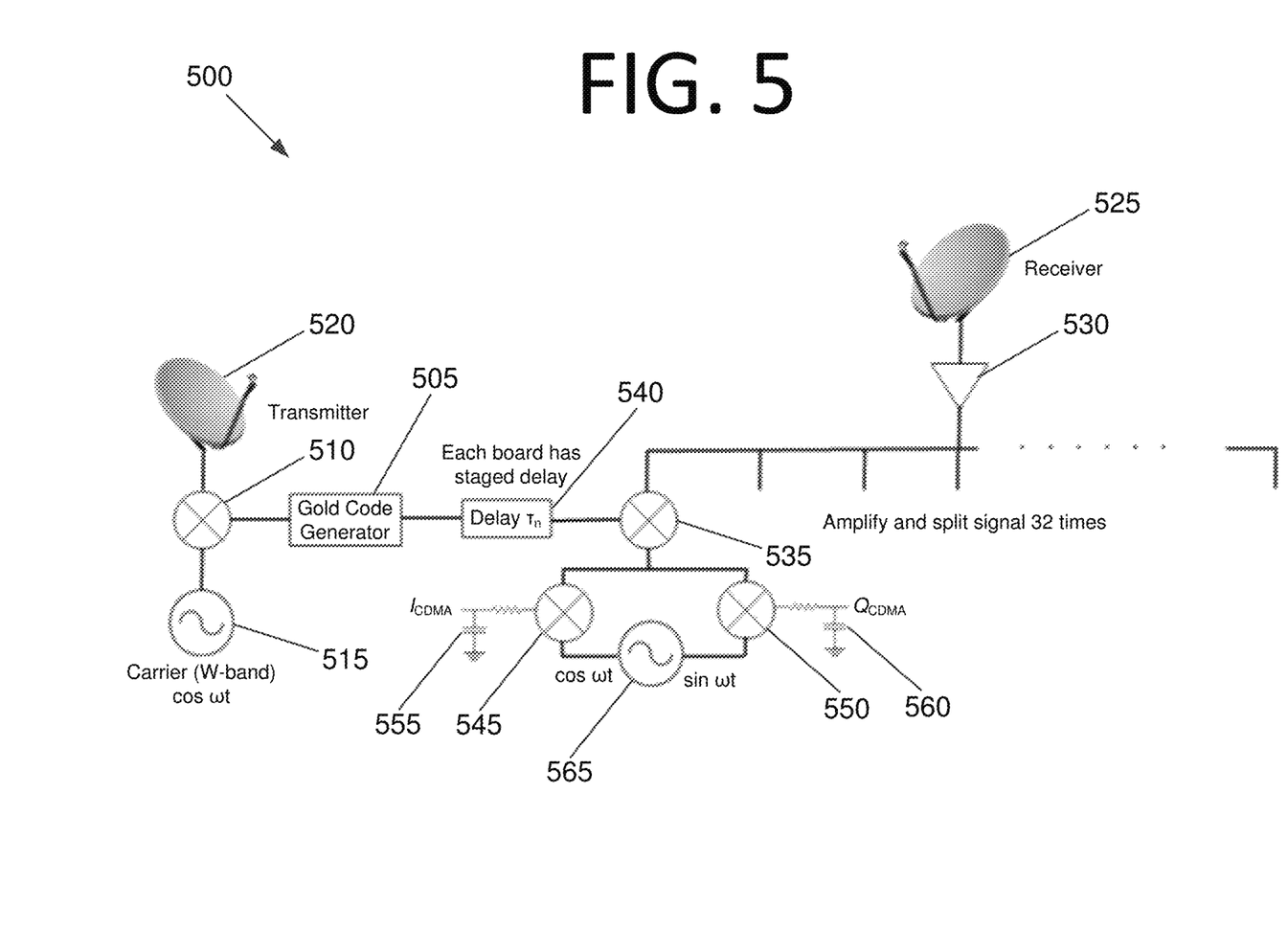
FIG. 5 is an architectural diagram illustrating an example hardware configuration for multiplexing CDMA return signals to obtain range-resolved reflection data, according to an embodiment of the present invention.

A Gold code or maximum length shift-register sequence (M-code) with a delta function autocorrelation function may be used to determine the range of patch reflectors for a given interrogation orientation. A basic hardware configuration 500 for the CDMA approach is shown in FIG. 5. While the functional parts of FIG. 5 are described for 1 GHz demonstration hardware and a 100 MHz Gold code, other frequencies may be used without deviating from the scope of the invention.

In the Gold code, 1s and −1s are generated every 10 nanoseconds in this embodiment. For this embodiment, the Gold code has 15 separate 1s and −1s (called "chips"), in a pseudo-random order. This sequence of chips (of length 150 nanoseconds in this embodiment) is reproduced 10 times, for a total signal length of 1.5 microseconds. A Gold code has a delta function autocorrelation function, which means that a sequence of N identical 15 chip long Gold code sequences multiplied by itself equals 15N if the Gold code is in phase (i.e., the 1s and −1s line up), but is −N if not. This provides a mechanism to determine the distance a radar signal is reflected from by correlating the return of a transmitted signal with a delayed signal.

Returning to FIG. 5, the Gold code is generated by a Gold code generator 505 and multiplied in a mixer 510 with the carrier signal generated at 1 GHz by carrier signal generator 515. The Gold code changes the phase of the carrier by $\pi$ every time a −1 is generated. This phase modulated signal, known as binary phase-shift keying (BPSK), is transmitted by transmitter 520 and reflected by a target (not shown) at a distance D. The reflected signal is received by a receiver 525, amplified by an amplifier 530 and split some number of times (in this case, 32 times) by splitters 535.

For each split, the initial Gold code is delayed by a staged delay 540 (where $\tau_n$ is the delay for the respective split) and mixed with the received signal by each respective splitter 535. After the mixed signal is split by splitters 545,550, respectively, a CDMA I signal is generated by in-phase signal modulator 555 and a CDMA Q signal is generated by quadrature-phase signal modulator 560, thus mixing in the in-phase and quadrature-phase modulations. I and Q are added in quadrature to form a signal $S = \sqrt{I^2 + Q^2}$. For splits where the delay corresponds to a reflection distance ($\tau/2c$) where there is no target, S is nearly zero. However, if the delay corresponds to a distance where there is a target, S is large and readily detected.

Note that this configuration is best if the target distance is known (i.e., this configuration is not optimal as a search radar). If the target distance is known and the target range width of interest is, for example, 100 down-range resolution cells, a very high resolution image can be generated very quickly.

A CDMA-SAR algorithm is somewhat similar to, but not exactly the same as, a frequency chirped SAR algorithm. Specifically, the CDMA masking identifies the distance to the target reflectors along some angular view. To make the CDMA results mirror a conventional SAR, the I+jQ function as found in a conventional SAR is substituted by a more exact representation of the Fourier transform G of the target's reflection function as found through the CDMA process. Then, the same Fourier correlation integral is used as in a conventional SAR inversion. Additionally, standard inversion techniques like the Maximum Entropy Method can be used to improve on the direct Fourier inversion.

In addition to CDMA coding, other spread-spectrum frequency approaches may be equivalently used to determine range-resolved reflection data. All different spread spectrum approaches with equivalent bandwidth may lead to equivalent range-resolved reflection data. In addition to a mono-static SAR geometry, where the receiver is at the same location as the transmitter, a bi-static SAR geometry may also be used, where the receiver location is different than the transmitter location.

Figure 6:
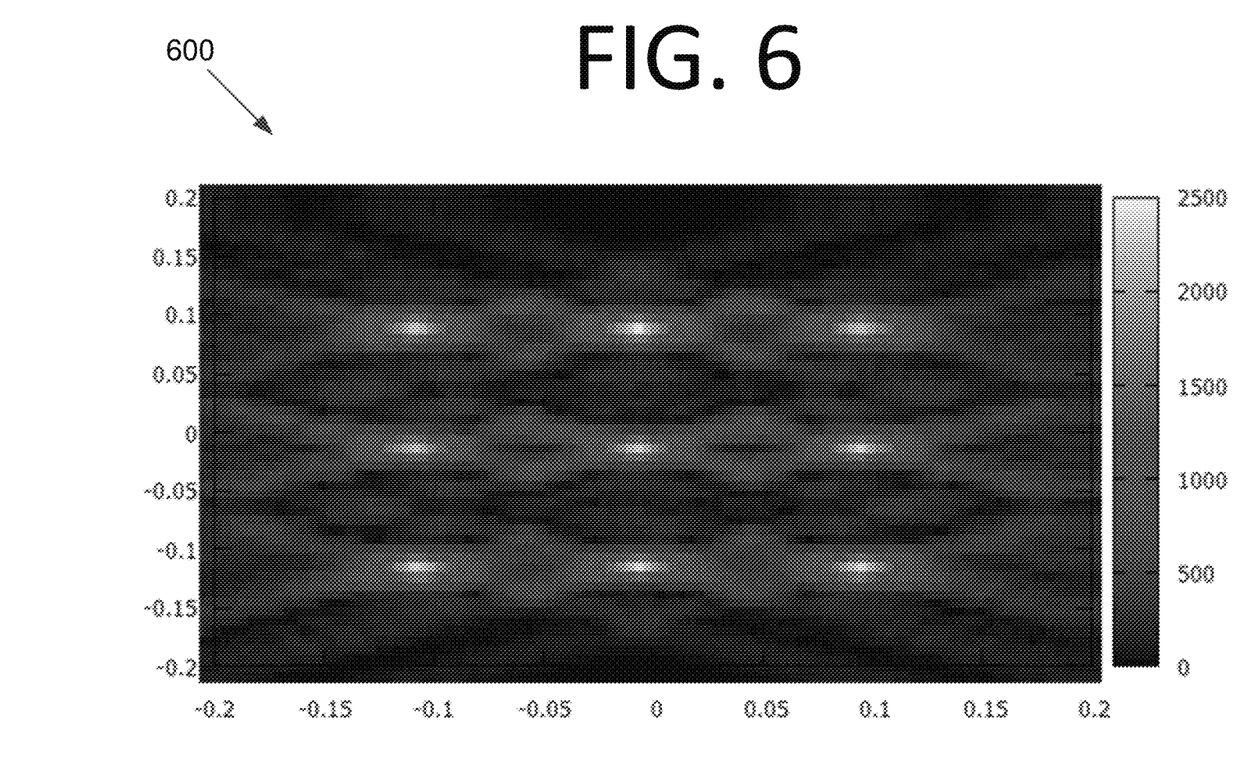
FIG. 6 is a graph illustrating CDMA SAR reconstruction of nine 1 cm reflections spaced 10 cm apart 100 km from a SAR, according to an embodiment of the present invention.

Graph 600 of FIG. 6 shows the results of modeling the image of an array of nine reflectors using the CDMA-SAR algorithm of some embodiments. In FIG. 6, the nine reflectors spaced were spaced 10 cm apart, with a center distance of 100 km and a 60° total angular view, with 0.3° angular steps. This modeling verifies the validity of the range-resolved reflection data approach.

The prototype CDMA-SAR was tested by transmitting a signal down a long cable (equivalent to 150 feet) to the receive hardware. The received and delayed signals are shown in graph 700 of FIG. 7, where the Gold/M algorithm codes the carrier with a 0 or $\pi$ phase shift, which has a 1 GHz carrier and a 100 MHz phase shift rate. For this example, the modulation bandwidth is much greater than 100 MHz, leading to very clear phase shifts every 10 periods of the carrier.

Figure 7:
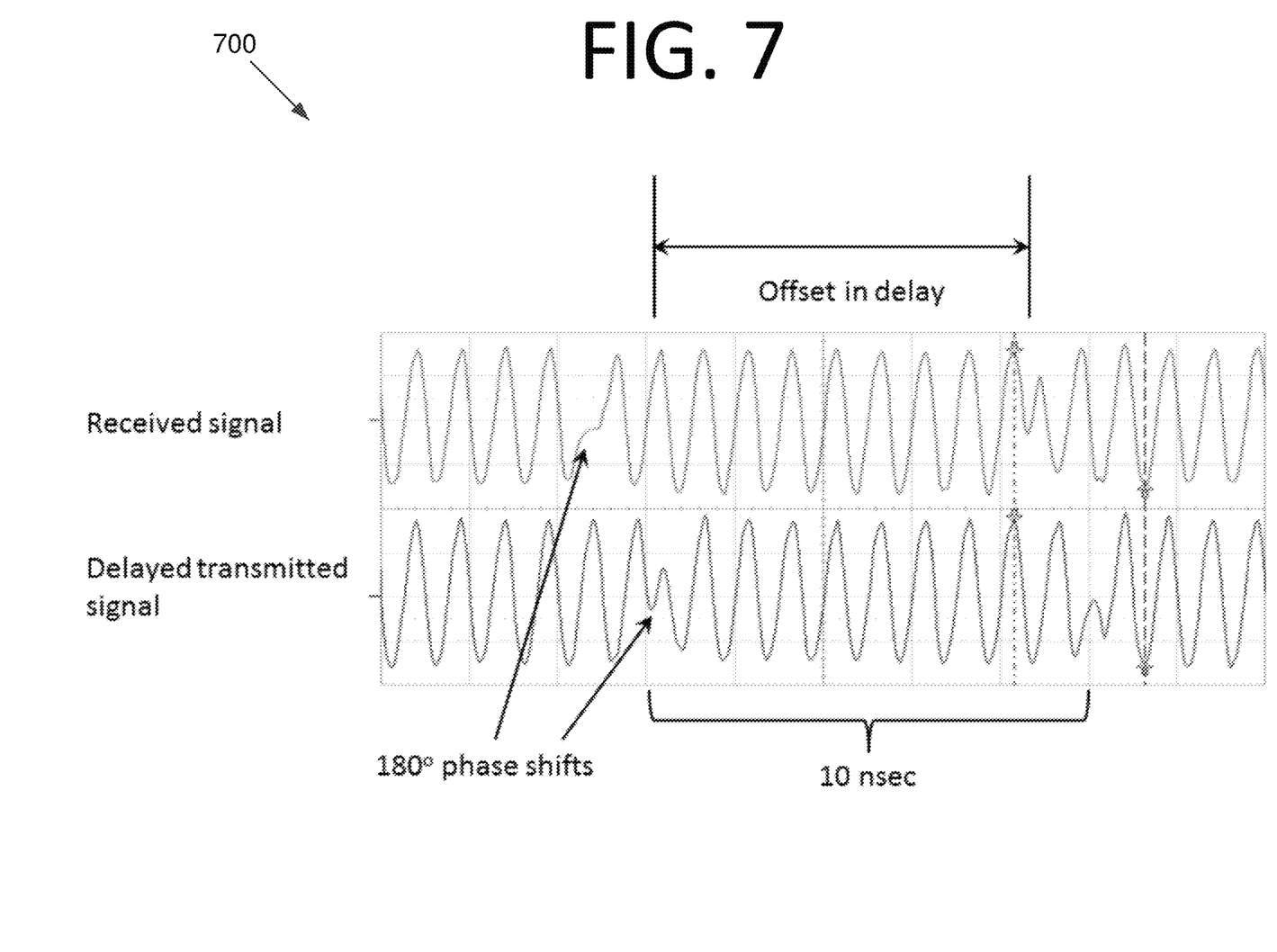
FIG. 7 is a graph illustrating a 1-GHz carrier, 100-MHz bandwidth example of coding with an M code, according to an embodiment of the present invention.

The fast oscillations correspond to the 1 GHz carrier, with a period of 1 nanosecond. The 0 or $\pi$ phase shift corresponding to the Gold code every 10 nanoseconds is clearly shown. The phase shift is done quickly (~1 nanosecond) because the system's actual bandwidth is ~1 GHz). 15

"chips" were used in this implementation of the Gold code, for a total code length of 150 nanoseconds. When the phase of the chips line up, the magnitude of I and Q in quadrature is at a maximum, indicating there is a reflection at the distance corresponding to that delay. The signals shown are not in phase.

The lower trace in FIG. 7 is the delayed transmitted signal and the upper trace is the received signal form a single scatterer. If an electronically delayed copy of the transmitted signal is mixed with the received signal, the resulting signal has a negligible baseband component unless the electronic delay is the same as the transit time to the scatterer. In FIG. 7, the electronic delay is approximately 9 nanoseconds shorter than the transmit time to the scatterer.

As an illustrative example of an M-code, a nominal 31-bit M-code is 1010111011000111110011010010000. It is easy to verify that this sequence has a correction value is 31 if the codes align and −1 for any nonzero offset (replacing the 0s with 1s and the 1s with −1s, which is done for actual transmission).

In the hardware, a delay is used to find what time separation leads to the large autocorrelation value. For this hardware demonstration, a code length of 15 phase shifts (chips), for a total code of 150 nanoseconds, was transmitted. The received signal was compared with various time delays against a window of the code repeated six time (900 nanoseconds). This sequence of six codes was repeated after a gap of two code lengths (300 nanoseconds). For these frequencies, shifting the delay to maximize the autocorrelation function led to a distance resolution (or range bin width) of about 10 feet (each shift bin is half a chip length, but there is a factor of 2 because the total path length is twice the distance to the target). There are 30 such range bins, so a target length of 300 feet can be interrogated. The 300 nanosecond gap prevented range aliasing for this test.

Figure 8:
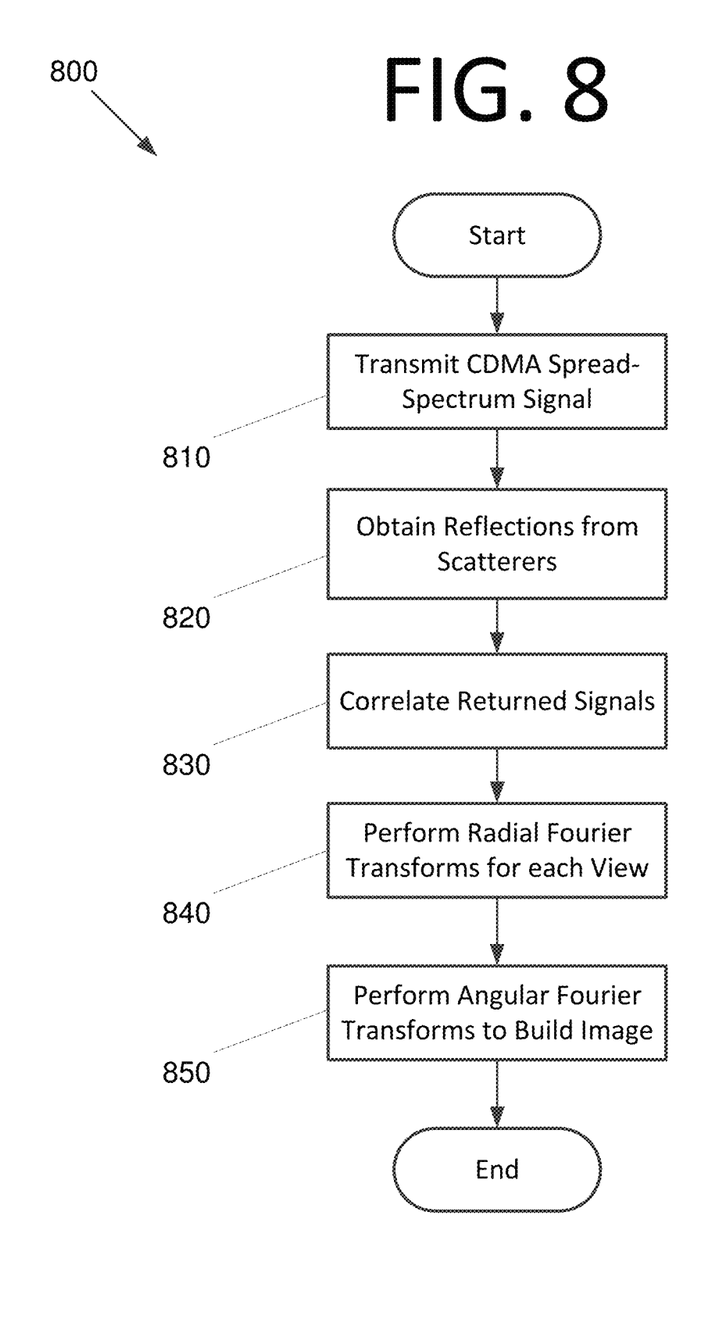
FIG. 8 is a flowchart illustrating a process for SAR imaging using range-resolved reflection data, according to an embodiment of the present invention.

FIG. 8 is a flowchart 800 illustrating a process for SAR imaging using range-resolved reflection data, according to an embodiment of the present invention. The process begins with transmitting a CDMA spread-spectrum signal at 810. Reflections from reflectors are then obtained at each angular view at 820 as returned signals. The returned signals are correlated with a delayed version of the transmitted signal at 830 to obtain range-resolved data at each angular view. If the delay time is exactly the same or very similar to the returned signal, the correlation number is N. If not, the correlation number is 0.

A radial Fourier transform is performed at each of the angular views at 840, and an angular Fourier transform is then performed at 850 as more views are collected. This builds the image as the views are conducted. The process then ends once a high resolution image is generated.

Once the range-resolved data at an angular view is obtained, the Fourier transform of the image may be synthetically constructed mathematically. A radial Fourier transform may be performed at each of the angular views, and an angular Fourier transform may then be performed as more views are collected, as in Eq. (5). This builds the image as the views are conducted.

Figure 9:
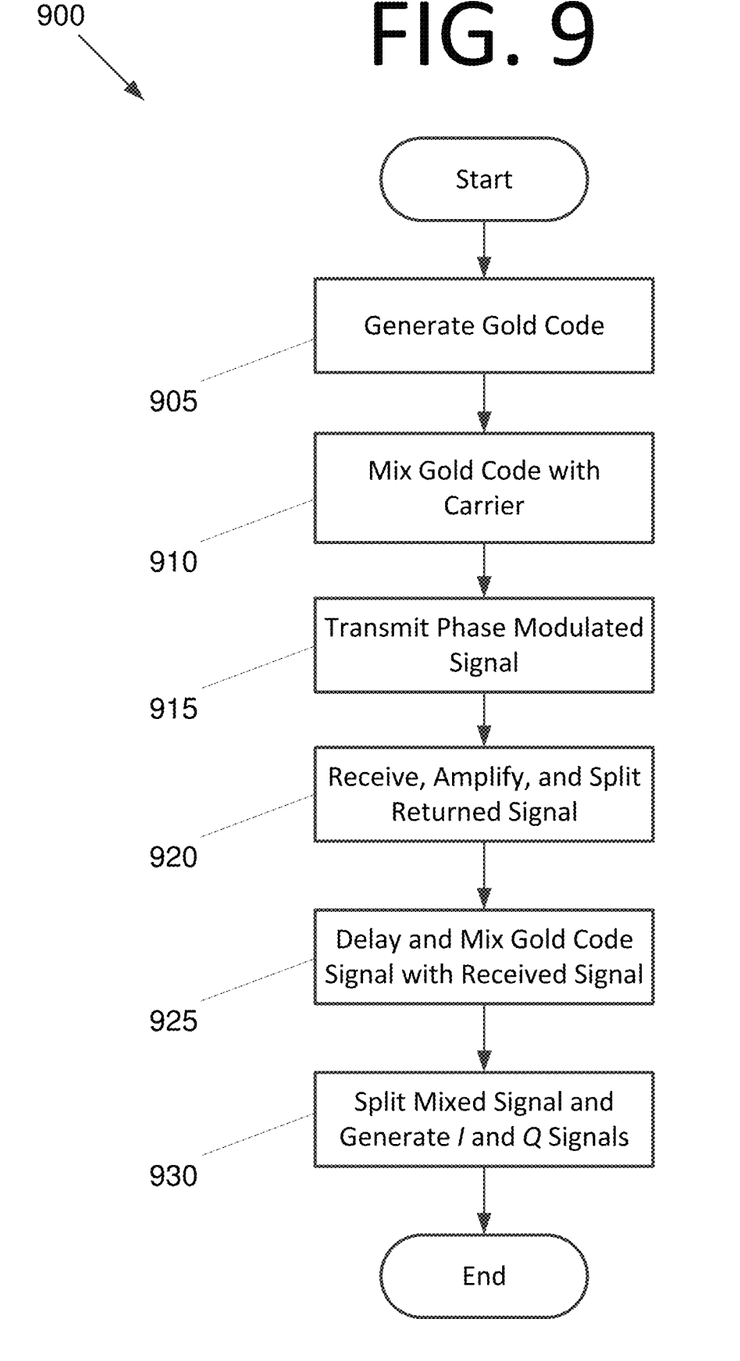
FIG. 9 is a flowchart illustrating a process for obtaining range-resolved reflection data, according to an embodiment of the present invention.

FIG. 9 is a flowchart illustrating a process 900 for obtaining range-resolved reflection data, according to an embodiment of the present invention. The process begins with generating a Gold code signal at 905. The Gold code is then multiplied with a carrier signal at 910. The Gold code changes the phase of the carrier by $\pi$ every time a −1 is generated. This phase modulated signal is transmitted at 915 and reflected by a target. The reflected signal is then received, amplified, and split a number of times at 920.

For each split, the initial Gold code is delayed by a staged delay and mixed with the received signal at 925. The mixed signal is then split, and a CDMA I signal and a CDMA Q signal are generated at 930, thus mixing in the in-phase and quadrature-phase modulations. For splits where the delay corresponds to a reflection distance ($\tau/2c$) where there is no target, I and Q are both essentially zero. However, if the delay corresponds to a distance D where there is a target, ($\tau/2c \cong D$), I and Q are nonzero.

Figure 10:
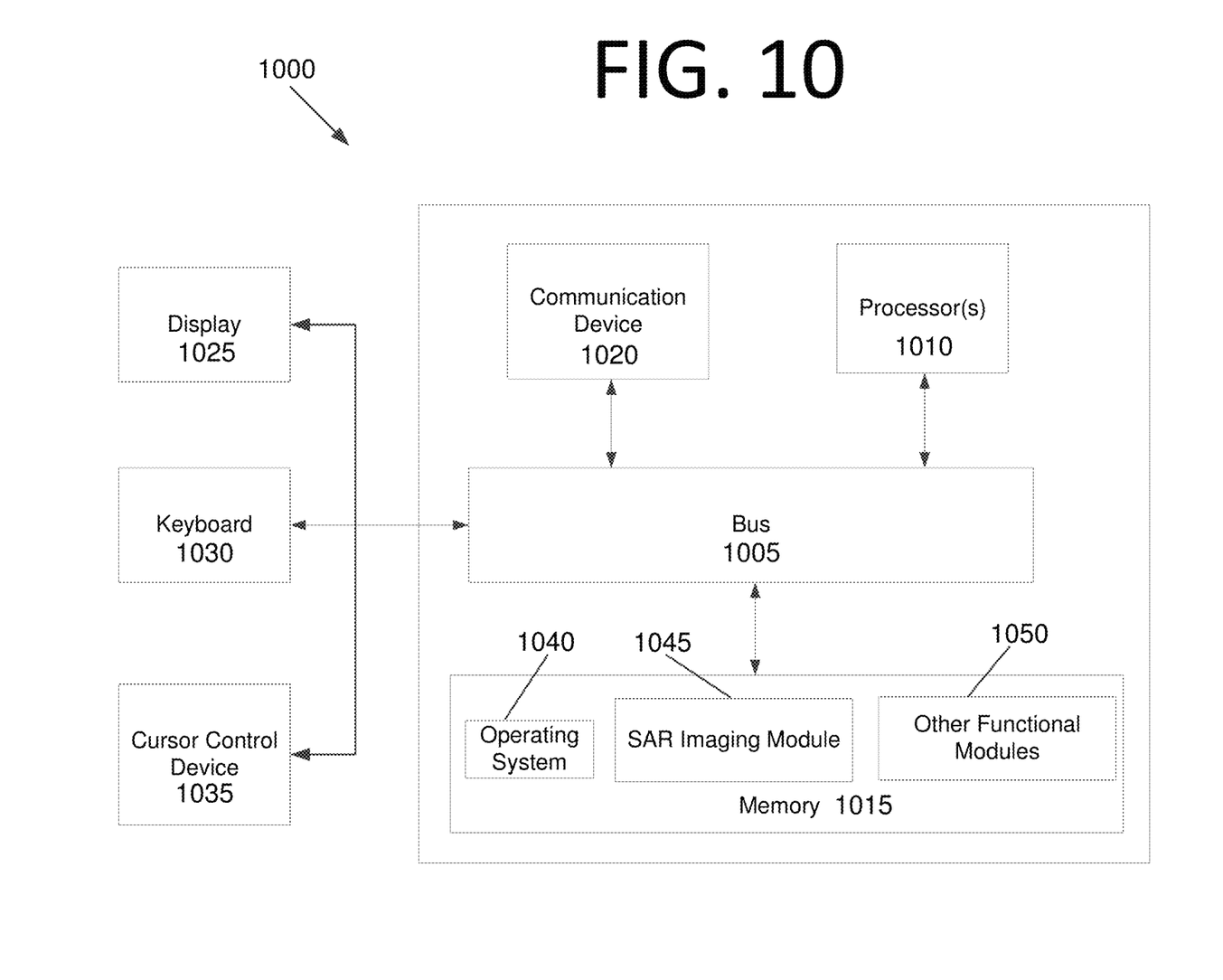
FIG. 10 is a block diagram illustrating a computing system configured to perform SAR imaging with range-resolved reflection data, according to an embodiment of the present invention.

FIG. 10 is a block diagram illustrating a computing system 1000 configured to perform SAR imaging with range-resolved reflection data, according to an embodiment of the present invention. Computing system 1000 includes a bus 1005 or other communication mechanism for communicating information, and processor(s) 1010 coupled to bus 1005 for processing information. Processor(s) 1010 may be any type of general or specific purpose processor, including a central processing unit ("CPU") or application specific integrated circuit ("ASIC"). Processor(s) 1010 may also have multiple processing cores, and at least some of the cores may be configured to perform specific functions. Multi-parallel processing may be used in some embodiments. Computing system 1000 further includes a memory 1015 for storing information and instructions to be executed by processor(s) 1010. Memory 1015 can be comprised of any combination of random access memory (RAM), read only memory (ROM), flash memory, cache, static storage such as a magnetic or optical disk, or any other types of non-transitory computer-readable media or combinations thereof. Additionally, computing system 1000 includes a communication device 1020, such as a transceiver and antenna, to wirelessly provide access to a communications network.

Non-transitory computer-readable media may be any available media that can be accessed by processor(s) 1010 and may include both volatile and non-volatile media, removable and non-removable media, and communication media. Communication media may include computer-readable instructions, data structures, program modules or other data in a modulated data signal such as a carrier wave or other transport mechanism and includes any information delivery media.

Processor(s) 1010 are further coupled via bus 1005 to a display 1025, such as a Liquid Crystal Display (LCD), for displaying information to a user. A keyboard 1030 and a cursor control device 1035, such as a computer mouse, are further coupled to bus 1005 to enable a user to interface with computing system. However, in certain embodiments such as those for mobile computing implementations, a physical keyboard and mouse may not be present, and the user may interact with the device solely through display 1025 and/or a touchpad (not shown). Any type and combination of input devices may be used as a matter of design choice.

Memory 1015 stores software modules that provide functionality when executed by processor(s) 1010. The modules include an operating system 1040 for computing system 1000. The modules further include a SAR imaging module 1045 that is configured to perform SAR imaging with range-resolved reflection data using any of the approaches discussed herein or derivatives thereof. Computing system 1000 may include one or more additional functional modules 1050 that include additional functionality.

One skilled in the art will appreciate that a "system" could be embodied as an embedded computing system, a personal computer, a server, a console, a personal digital assistant (PDA), a cell phone, a tablet computing device, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, RAM, tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The process steps performed in FIGS. 8 and 9 may be performed by a computer program, encoding instructions for the processor to perform at least the processes described in FIGS. 8 and 9, in accordance with embodiments of the present invention. The computer program may be embodied on a non-transitory computer-readable medium. The computer-readable medium may be, but is not limited to, a hard disk drive, a flash device, a random access memory, a tape, or any other such medium used to store data. The computer program may include encoded instructions for controlling the processor to implement the processes described in FIGS. 8 and 9, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an ASIC.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method for performing synthetic aperture radar (SAR) imaging with range-resolved reflection data, comprising:
   analyzing a reflected spread-spectrum signal, by a computing system;
   gathering the range-resolved reflection data from the spread-spectrum signal, by the computing system; and
   constructing an approximation of a two-dimensional Fourier transform of a target's scattering function, by the computing system, wherein
   the construction of the approximation is performed based on the analysis and the range-resolved reflection data.

2. The computer-implemented method of claim 1, wherein the range-resolved reflection data from the spread-spectrum signal is gathered at each angular view of a plurality of angular views using a reflected signal received by a receiver.

3. The computer-implemented method of claim 2, further comprising:
generating a high resolution image, by the computing system, by performing a radial Fourier transform and an angular Fourier transform at each of angular view as the angular view is gathered.

4. The computer-implemented method of claim 3, further comprising:
generating a high resolution image, by the computing system, by improving the direct Fourier inversion with a Maximum Entropy Method.

5. The computer-implemented method of claim 1, wherein the spread-spectrum signal is a code division multiple access (CDMA) signal, and the method further comprises:
transmitting the CDMA spread-spectrum signal, by the computing system, that reflects off one or more objects; and
receiving a reflected CDMA spread-spectrum signal, by the computing system, via a receiver, from the reflection of the transmitted CDMA spread spectrum signal for each of a plurality of angular views.

6. The computer-implemented method of claim 5, further comprising:
obtaining reflections from reflectors in the reflected CDMA spread-spectrum signal at each angular view, by the computing system.

7. The computer-implemented method of claim 6, further comprising:
correlating the obtained reflections, by the computing system, with a delayed version of the transmitted CDMA spread-spectrum signal to obtain range-resolved data at each angular view of the plurality of angular views, the delayed version of the transmitted CDMA signal delayed by a delay time.

8. The computer-implemented method of claim 7, further comprising:
when a delay time is the same as the returned signal, setting a correlation number associated with the correlation to N, by the computing system; and
when the delay time is not the same, setting the correlation number to 0, by the computing system, wherein N is a number of chips.

9. The computer-implemented method of claim 1, further comprising:
generating a Gold code signal and multiplying the Gold code with a carrier signal, by a computing system, to obtain a phase modulated signal.

10. The computer-implemented method of claim 9, further comprising:
transmitting the phase modulated signal that reflects off one or more objects; and
receiving reflections as the reflected spread-spectrum signal, amplifying, and splitting the reflected signal, by the computing system; and
for each split, delaying the initial Gold code by a staged delay, and mixing the delayed Gold code with the received signal, by the computing system.

11. The computer-implemented method of claim 10, further comprising:

splitting the mixed signal and generating and a CDMA I signal and a CDMA Q signal, by the computing system, wherein
for splits where the delay corresponds to a reflection distance ($\tau/2c$) where there is no target, I and Q are both approximately zero, and
when the delay corresponds to a distance D where there is a target, ($\tau/2c \cong D$), I and Q are nonzero, wherein $\tau$ is a split delay and c is the speed of light.

12. The computer-implemented method of claim 1, further comprising:
approximating a Fourier transform of a reflection function G from the range-resolved reflection data at each angular view $\theta$ of a plurality of angular views in the reflected signal to obtain an approximate function, by the computing system; and
inverting the approximate function, by the computing system.

13. The computer-implemented method of claim 1, wherein the reflected spread spectrum signal from all reflectors within the target are seen from each view of a plurality of angular views in the reflected signal unless one or more reflectors is obscured by another reflector.

14. A computer-implemented method for performing synthetic aperture radar (SAR) imaging with range-resolved reflection data, comprising:
transmitting a code division multiple access (CDMA) spread-spectrum signal, by a computing system;
receiving a reflected CDMA spread-spectrum signal, by the computing system;
analyzing the reflected CDMA spread-spectrum signal, by a computing system;
gathering the range-resolved reflection data from the CDMA spread-spectrum signal, by the computing system;
constructing an approximation of a two-dimensional Fourier transform of a target's scattering function, by the computing system; and
generating a high resolution image, by the computing system, wherein
the range-resolved reflection data from the CDMA spread-spectrum signal is gathered at each angular view of a plurality of angular views, and
the high resolution image has a resolution of 1.5 centimeters or less, wherein
the construction of the approximation is performed based on the analysis and the range-resolved reflection data.

15. The computer-implemented method of claim 14, further comprising:
obtaining reflections from reflectors in the reflected CDMA spread-spectrum signal at each angular view as returned signals, by the computing system; and
correlating the returned signals, by the computing system, with a delayed version of the transmitted CDMA spread-spectrum signal to obtain range-resolved data at each angular view, the delayed version of the transmitted CDMA signal delayed by a delay time.

16. The computer-implemented method of claim 15, further comprising:
when a delay time is the same as the returned signal, setting a correlation number associated with the correlation to N, by the computing system; and
when the delay time is not the same, setting the correlation number to 0, by the computing system, wherein N is a number of chips.

17. A computer-implemented method for performing synthetic aperture radar (SAR) imaging with range-resolved reflection data, comprising:
- transmitting a code division multiple access (CDMA) spread-spectrum signal, by a computing system;
- receiving a reflected CDMA spread-spectrum signal, by the computing system;
- obtaining reflections from reflectors in the reflected CDMA spread-spectrum signal at each angular view as returned signals, by the computing system;
- correlating the returned signals, by the computing system, with a delayed version of the transmitted CDMA spread-spectrum signal to obtain the range-resolved data at each angular view, the delayed version of the transmitted CDMA signal delayed by a delay time; and
- constructing an approximation of a two-dimensional Fourier transform of a target's scattering function, by the computing system, wherein
- the construction of the approximation is performed based on the analysis and the range-resolved reflection data.

18. The computer-implemented method of claim 17, further comprising:
- when a delay time is the same as the returned signal, setting a correlation number associated with the correlation to N, by the computing system; and
- when the delay time is not the same, setting the correlation number to 0, by the computing system,
- wherein N is a number of chips.

* * * * *